C. GLEICHE.
STEERING DEVICE FOR AGRICULTURAL MACHINES.
APPLICATION FILED MAR. 26, 1915.
1,155,351. Patented Oct. 5, 1915.
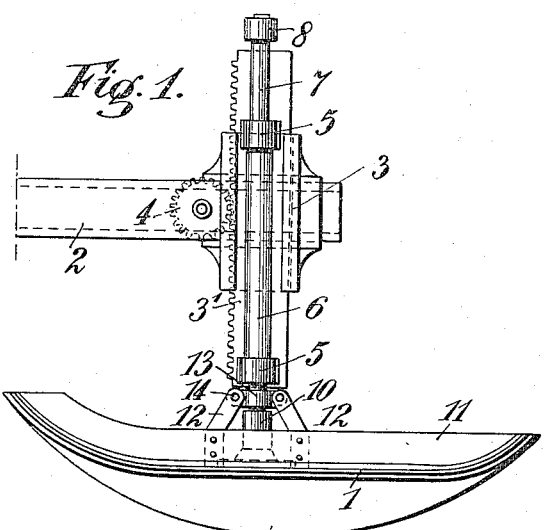
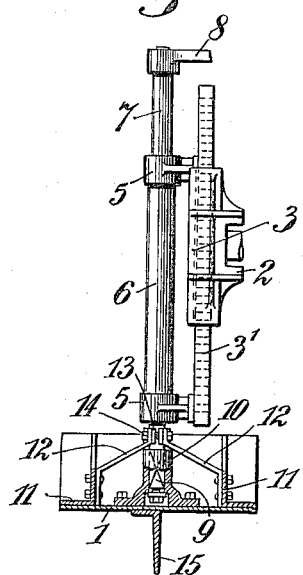
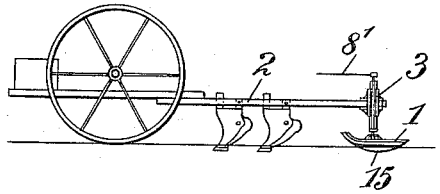
Witnesses:
Inventor: Carl Gleiche
Attorney

UNITED STATES PATENT OFFICE.

CARL GLEICHE, OF BERLIN, GERMANY, ASSIGNOR TO STOCK MOTORPFLUG GESELLSCHAFT MIT BESCHRÄNKTER HAFTUNG, OF BERLIN, GERMANY, A CORPORATION OF GERMANY.

STEERING DEVICE FOR AGRICULTURAL MACHINES.

1,155,351.      Specification of Letters Patent.      Patented Oct. 5, 1915.

Application filed March 26, 1915. Serial No. 17,249.

*To all whom it may concern:*

Be it known that I, CARL GLEICHE, a subject of the German Emperor, and resident of Eisenbahnstrasse 21, Berlin, S. O. 33, Germany, have invented certain new and useful Improvements in Steering Devices for Agricultural Machines, of which the following is a specification.

The present invention relates to a steering device for agricultural machines, particularly intended for use in conjunction with motor plows.

The invention provides a steering device for marshy or very soft ground, preventing the steering member from sinking too deeply into the said ground.

According to the invention this object is obtained by the provision of a steering shoe replacing the otherwise usual steering wheel.

The invention is illustrated, by way of example, in the accompanying drawing, in which:

Figure 1 is a side elevation and Fig. 2 is an end elevation of the steering shoe, the lower part thereof being shown in section. Fig. 3 illustrates diagrammatically a motor plow provided with a steering shoe.

In the case illustrated in Fig. 3, the steering shoe 1 is provided at the rear end of the plow beam 2, adjustable in height and rotatable about a vertical axis so that, it serves not only for the lateral steering of the motor plow but also for adjusting the plow beam in height and thereby the ground tilling implements secured to the said beam. To this end the free end of the plow beam 2 is provided with a guide 3 in which a rack 3' is adapted to move up and down, engaging with a gear wheel 4 rotatable preferably from the plow driver's seat, by means of which the said rack can be raised or lowered according to requirements. The rack 3' is provided with two annular bearings 5 in which a rod 7 can be rotated, having an enlarged portion 6 between the said bearings, the upper end of the said rod 7 carrying an arm 8 for connection with the steering rod 8'.

The lower end of the rod 7 engages through the medium of a squared portion 9 in a correspondingly shaped foot bearing 10 of the steering shoe 1 so that when the rod 7 rotates the shoe is also rotated in a horizontal direction. The steering shoe 1 consists of a flat rail bent up at both ends and preferably provided with reinforcing ribs 11 which through the medium of crossmembers 12 is detachably connected with a strap 13 surrounding the lower end of the rod 7, by means of bolts 14 or the like. On its lower end, the steering shoe 1 is provided with a rib 15 engaging into the ground, the depth of which decreases from the center to its ends.

As the steering shoe bears on the ground with a large surface when the motor plow or any other machine provided therewith is driven, it is obvious that it cannot penetrate the ground too deeply should the latter be marshy or very soft and owing to the fact that the fairly deep rib 15 penetrates the ground, the lateral thrust necessary for steering purposes, is insured.

The curved form of the steering shoe and the tapering of the rib 15 toward both ends, prevent the production of a too strong back pressure on the steering device when steering.

What I claim as my invention and desire to secure by Letters Patent is:—

1. Steering device for agricultural machine, comprising in combination a steering shoe, a rib at the bottom side of said steering shoe and adapted to penetrate the ground and to produce the lateral pressure for steering, a vertical rod in connection with the frame of said machine, said steering shoe being firmly fixed to the bottom end of said rod, means for vertically moving said rod, and means for rotating said rod, substantially as described.

2. Steering device for agricultural machine comprising in combination a steering shoe consisting of a rail member bent up at both ends and provided beneath with a blade of varying width, a vertical rod carried in a foot-bearing arranged on said rail member, a steering arm attached to said rod, a rack with annular bearings for said vertical rod, a guide member carried by the frame of the machine in which said rack can be adjustably arranged.

3. Steering device for agricultural machine comprising in combination a steering shoe consisting of a rail member bent up at both ends, a blade attached thereto the depth thereof decreasing from center to ends, a vertical rod attached to said shoe, a rack carrying bearings for said vertical rod, a guide member arranged on the frame of the machine carrying said rack, and a gear wheel operable by the driver for adjusting the height of said rack, and a steering arm attached to said vertical rod substantially as described.

In testimony whereof I have hereunto signed my name this 23rd day of February, 1915, in the presence of two subscribing witnesses.

CARL GLEICHE.

Witnesses:
  HENRY HASPER,
  WOLDEMAR HAUPT.

Copies of this patent may be obtained for five cents each, by addressing the "Commissioner of Patents, Washington, D. C."